United States Patent [19]
Canniff et al.

[11] Patent Number: 5,619,564
[45] Date of Patent: Apr. 8, 1997

[54] TONE DETECTOR WITH IMPROVED PERFORMANCE IN THE PRESENCE OF SPEECH

[75] Inventors: Ronald J. Canniff, Naperville; Ali N. Jablway, Aurora, both of Ill.

[73] Assignee: Lucent Technologies Inc., Murray Hill, N.J.

[21] Appl. No.: 455,805

[22] Filed: May 31, 1995

[51] Int. Cl.$^6$ .................................................. H04M 1/50
[52] U.S. Cl. .......................... 379/386; 379/283; 379/282; 379/351
[58] Field of Search .................................. 379/386, 283, 379/282, 351, 372, 350; 328/138, 136, 137

[56] References Cited

U.S. PATENT DOCUMENTS

| | | | |
|---|---|---|---|
| 5,214,693 | 5/1993 | Chujo | 379/386 |
| 5,325,427 | 6/1994 | Dighe | 379/386 |
| 5,392,348 | 2/1995 | Park et al. | 379/386 |
| 5,408,529 | 4/1995 | Greaves | 379/386 |
| 5,426,696 | 6/1995 | Zimbrek | 379/386 |
| 5,459,784 | 10/1995 | Tzeng | 379/386 |

OTHER PUBLICATIONS

"Algorithms for Multi–Channel DTMF Detection for the We®DSP32 Family", S.L. Gay, J. Hartung and G. L. Smith, Int'l Conference on Acoustics, Speech and Signal Processing (ICASSP), vol. 2, 23–26, May 1989, Glasgow, Scotland, pp. 1134–1137.

*Digital Signal Processing*, A. V. Oppenheim and R.W. Schafer, pp. 230–237, 287–289, Prentice–Hall Inc., Englewood Cliffs, NJ 1975.

"Linear Prediction Based DTMF Detection for the WE®DSP32 Digital Signal Processor Family", S.L. Gay, J. Hartung and G.L. Smith, Jun., 1989 pp. 1–19.

"Detection Of Tones While Minimizing Incorrect Identification Of Other Sounds As Tones", Serial No. 08/267,091, Filed Jun. 28, 1994 (J. W. Daugherty 2–5).

*Primary Examiner*—Thomas W. Brown
*Assistant Examiner*—Jacques M. Saint-Surin
*Attorney, Agent, or Firm*—Charles L. Warren

[57] ABSTRACT

This tone detector which is suited for dual tone multifrequency (DTMF) digit detection, separates the pairs of tones into a low frequency and high frequency group in which the other frequency group is attenuated by filtering. The amplitude of the low and high frequency groups serve as separate variable threshold reference signals. Individual tones are bandpass filtered with their corresponding outputs converted into an amplitude signal. The amplitude of the individually bandpass filtered tone signals are compared against the corresponding low or high frequency variable threshold signal for a determination of whether a tone is present. Preferably, additional validation steps are applied to the preliminary tone decisions to provide improved digit detection accuracy, especially in the presence of other signals such as speech.

23 Claims, 7 Drawing Sheets

TONE DETECTOR WITH IMPROVED PERFORMANCE IN THE PRESENCE OF SPEECH

BACKGROUND OF THE INVENTION

This invention is directed in general to tone detectors and more specifically, to tone detectors which must function to detect tones on a communication channel in which speech or other signals may be present. This invention is specifically, but not exclusively, suited for dual tone multifrequency (DTMF) digit detection such as in a telecommunication system.

It is becoming increasingly important to be able to detect tones such as DTMF digits on a communication channel which may also carry other signals such as voice. An idealized detector detects a predetermined set of tones and does not mistake other signals such as speech as one of the predetermined tones. Services which are selectable by DTMF signaling over a telecommunication system, are becoming increasingly popular. However, since other background noise or signals may be present on the same channel which carries the DTMF digits, the tone detector or receiver, such as at a central office, must be capable of reliably detecting the DTMF digits while simultaneously minimizing false detections which may be caused by other signals or voice on the channel.

DTMF digit detectors must operate under difficult conditions. First, the detector must be able to correctly detect a received DTMF digit over a range of characteristics defined by signaling standards that define a valid digit, including variations of the frequency of the tone, amplitude of the tone (both as an absolute value and relative to the amplitude of the dual tone pair), and subject to intermodulation distortions and other noise within defined limits. Second, the DTMF detector must also minimize the number of false or talk-off detections due to the presence of speech. Many previous DTMF detectors have achieved reasonably good performance in one of these two requirements but has typically not been totally successful in simultaneously achieving both requirements. Thus, there exists a need for an improved tone detector which not only accommodates required variations of the tones but also minimizes false detection such as due to talk-off.

SUMMARY OF THE INVENTION

It is an object of the present invention to provide a tone detector and corresponding method which provides improved performance while substantially satisfying both the above stated requirements.

In accordance with an illustrative embodiment of the present invention, a DTMF receiver segregates the processing of the tones into a low frequency group and a high frequency group. A high tone band elimination filter eliminates the high tones from the low frequency group; a low tone band elimination filter eliminates the low tones from the high frequency signals. Separate bandpass filters for each low frequency tone operate on the filtered low frequency signal; separate bandpass filters operate to filter each high frequency tone from the high frequency filtered signal. The low frequency and high frequency filtered signals are utilized to generate low and high frequency variable threshold signals. The bandpass filtered low frequency signals and bandpass filtered high frequency signals are compared with the low frequency and high frequency variable threshold signals, respectively, in order to determine if one or more low frequency or high frequency tones are present.

Post-tone detection processing is also utilized before a final decision is made as to whether a valid DTMF tone has been received. The low frequency and high frequency tone decisions are validated to determine whether a valid tone could have been received. The amplitudes of the respective low frequency and high frequency tones are compared to insure that they meet the amplitude requirements defined as a valid digit. Also, the duration of the low and high frequency tones is checked against timing requirements which further specify requirements for a valid digit. A valid DTMF digit is reported only if appropriate low and high frequency tones have been determined and if the post-processing checks further validate the detection of a digit.

DETAILED DESCRIPTION

In order to better appreciate the explanation of an embodiment of the present invention, it is important to appreciate the nature of the DTMF tones to be detected. Table 1 below illustrates the eight tones separated into four lower frequency tones and four higher frequency tones. Each valid DTMF digit consists of the simultaneous transmission of one tone from the lower frequency group and one tone from the higher frequency group.

TABLE 1

| | DTMF Frequency Combination | | | |
|---|---|---|---|---|
| | High Group Frequency (Hz) | | | |
| Low Group Frequency (Hz) | 1209 | 1336 | 1477 | 1633 |
| 697 | 1 | 2 | 3 | A |
| 770 | 4 | 5 | 6 | B |
| 852 | 7 | 8 | 9 | C |
| 941 | * | 0 | # | D |

It will be apparent that for a typical voice frequency channel such as from 300–3000 Hz, the tones constitute in-band signaling. Thus, other signals including speech will also generate signals of the same frequencies utilized by the DTMF tones.

Additional parameters specify requirements for valid digit detection. A frequency variation of each tone of ±1.8% must be accepted. Maximum and minimum power levels of ≦0.8 dbm and ≧3.55 dbm, respectively, are defined. The maximum difference (twist) between amplitudes of the two tones must be between −8.75 and 7.25 dB. Also, a tone duration of ≧39.5 milliseconds is required. Additional requirements relate to interfering signals and noise requirements. For example, signal echoes delayed up to 20 milliseconds and 16 dB below the primary signal should not disrupt the detection of a digit. Also, interfering signals in the range of 300–480 Hz with a total power level of −46 dbm must be tolerated as well as interfering signals in the range of 480–3400 Hz with a total power level of 20 dB below the level of the low signaling frequency or −46 dbm, whichever is greater. A receiver must function at a 16 dB signal-to-noise ratio relative to the lowest amplitude. Although signal distortion is not clearly defined in terms of acceptable parameters, certain amounts of signal distortion must be tolerated based on the allowable distortion allowed for corresponding DTMF transmitters. Thus, it will be apparent that the breadth of conditions and variations which must be tolerated places substantial burdens on a DTMF receiver, especially considering the desirability to minimize talk-off and other voice and signal interfering conditions.

Figure 1:
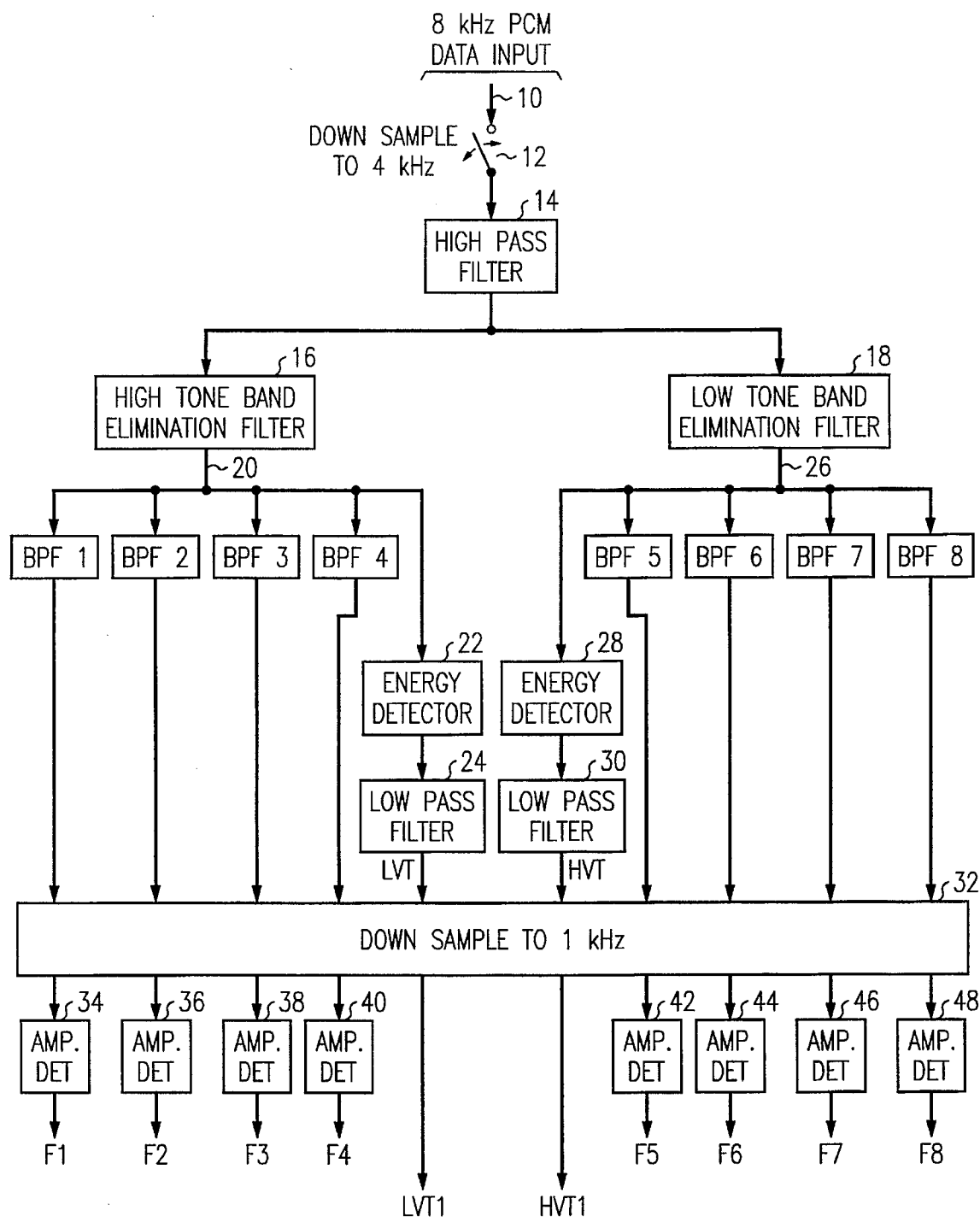
FIGS. 1 and 2 illustrate a block diagram of an embodiment of a tone receiver in accordance with the present invention.

Referring to FIG. 1, a communication channel 10 receives digital samples of received data in pulse code modulation (PCM) format such as at an 8 kilohertz (kHz) rate. This data may represent information received from a subscriber in a telecommunication system and will include DTMF generated tones as well as information such as voice, noise, or other signals carried by the channel. In the illustrative embodiment, the data is processed in a digital format to determine if a DTMF digit has been received. However, it will be apparent to those skilled in the art that analog components or a combination of analog and digital implementations could be utilized to perform the steps and elements in accordance with the illustrative embodiment of the present invention.

A mechanism 12 for down-sampling converts the 8 kilohertz PCM data to 4 kilohertz data which is transmitted to high-pass filter 14. The high-pass filter 14 is utilized to attenuate power line frequency components at 60 Hz and harmonics of such power line components. In applications where dial tone is present, high-pass filter 14 may also be designed to attenuate it as well as the power line components. The high-pass filtered data is divided and provided as inputs to the high-tone band elimination filter 16 and the low-tone band elimination filter 18. Both of these filters are similar in that their objective is to pass other frequencies while eliminating a predetermined band of frequencies. In the case of filter 16 frequencies 1209 Hz–1633 Hz (high frequency tone group) are eliminated while passing frequencies higher and lower than this band. Similarly, filter 18 rejects or attenuates signals in the 697 Hz–941 Hz (low frequency tone group) while passing other frequencies. Thus, filters 16 and 18 serve to attenuate the other low frequency or high frequency tone of the pair of tones which constitute a single DTMF digit.

The filtered output 20 from filter 16 provides an input to bandpass filters BPF1, BPF2, BPF3, and BPF4. Each of these bandpass filters are centered respectively about each of the four low frequency tones of the DTMF tone pair. The output 20 also is received by energy detector 22 which determines the overall energy present in filtered signal on line 20. Energy detector 22 may comprise a squaring type detector which generates an average energy level and unwanted high frequency components. The detected energy signal from energy detector 22 is smoothed by low-pass filter 24 to derive a lower frequency group variable threshold signal (LVT).

Similarly, the output 26 of filter 18 provides an input to bandpass filters BPF5, BPF6, BPF7, and BPF8 which are centered about each tone in the high frequency group. The energy in the output 26 from filter 18 is detected by energy detector 28. The detected energy signal is low-pass filtered by filter 30 to result in the high group frequency variable threshold signal (HVT).

The bandpass filtered output signals from bandpass filters BPF1–BPF8 as well as the LVT and HVT signals are generated at a 4 kilohertz rate and are then, preferably, down-sampled to a 1 kilohertz rate by down-sampling circuit 32. For example, the down-sampling may be accomplished by merely operating on every fourth signal sample. Likewise, down-sampler 12 may similarly operate by merely operating on every other sample provided on channel 10. The purpose of down-sampling is to minimize the structure, the number of comparing steps, and the computation power required to process the signals, while still resulting in a reliable DTMF digit detection decision. By using down-sampling, the number of instructions per second required to provide the indicated functionality is reduced thereby, minimizing the number of computations required as well as reducing the computing power required to implement the illustrative technique.

Amplitude detectors 34, 36, 38, and 40 detect the amplitude of the down-sampled output signals from bandpass filters BPF1, BPF2, BPF3, and BPF4, respectively. Similarly, amplitude detectors 42, 44, 46, and 48 detect the amplitude of the down-sampled output signals from bandpass filters BPF5, BPF6, BPF7, and BPF8, respectively. The outputs F1–F8 from the amplitude detectors 34–48 represent the energy associated with signals, if any, occurring during the corresponding data sample for each of the eight discrete tones which may comprise a DTMF digit. The down-sampled LVT and HVT signals are provided as output signals LVT1 and HVT1.

Figure 2:
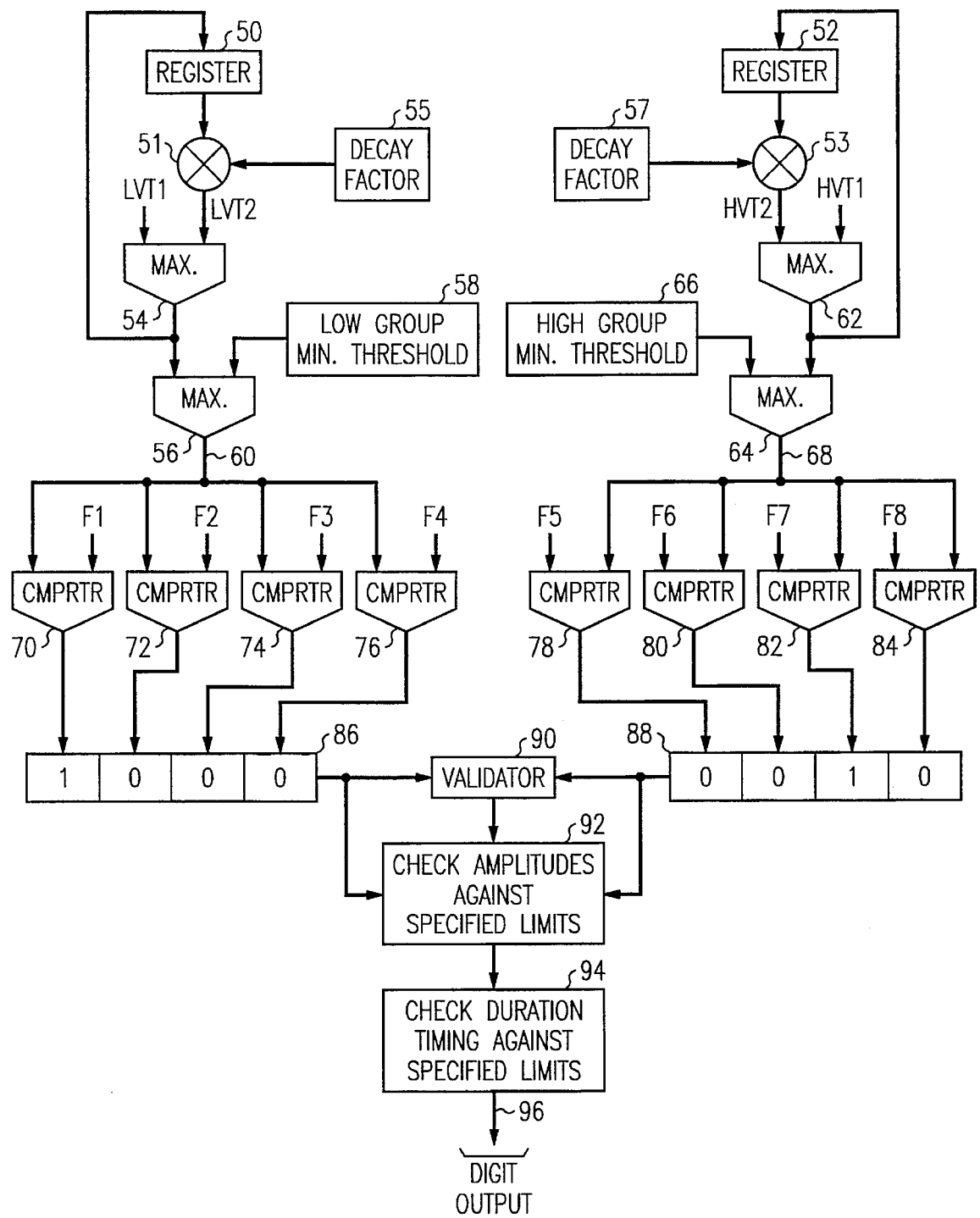

Referring to FIG. 2 a maximum selector 54 receives inputs of the LVT1 and LVT2 signals and selects the signal with the larger magnitude which is output and received as an input to a maximum selector 56. Register 50 receives the output of maximum selector 54 and stores this value for one iteration (sample). This register's value is an input to multiplier 51 which also receives an input from decay factor register 55. The output of multiplier 51 is LVT2. The decay factor stored in register 55 is a constant value of less than 1 which limits the decay rate of the signal out of maximum selector 54. The other input to selector 56 comprises a signal, stored in register 58 representing a low frequency group minimum amplitude threshold for detecting a valid low frequency tone. The selector 56 selects the maximum value from its inputs to pass through to its output 60.

Similarly, a maximum selector 62 selects the maximum amplitude signal from among the HVT1 and HVT2 signals to provide an output to maximum selector 64. Register 52, multiplier 53, and decay factor register 57 function in a similar way to previously described register 50, multiplier 51, and decay factor register 55. Selector 64 also receives as an input a signal representative of the minimum permitted amplitude threshold of a high frequency tone group allowed to be detected as a valid tone of a DTMF digit. Maximum selector 64 selects the larger of the two input signals and provides this selected signal as an output 68. The values stored in registers 58 and 66 set a minimum amplitude threshold below which received tones will be rejected.

Two sets of comparators utilize reference signals 60 and 68, respectively, to make individual determinations of whether each of the possible signals F1–F8 are present. Comparators 70, 72, 74, and 76 utilize the dynamically variable threshold based on the LVT signal and compare the energy levels associated with signal F1, F2, F3, and F4, respectively. The output of these comparators is TRUE or a logical "1" if the associated frequency signal is larger than the threshold; the output is FALSE or a logical "0" if the respective signal is less than the threshold. Similarly, comparators 78, 80, 82, and 84 utilize the dynamic threshold signal 68 based on the HVT signal and make comparative determinations as to whether tones associated with signals F5, F6, F7, and F8, respectively, are present. Registers 86 and 88 contain, for each sample, the respective output decisions from the low frequency and high frequency set of comparators. In the illustrative embodiment, only the output of comparators 72 and 82 were TRUE representing an intermediate decision that low frequency tone 697 Hz and high frequency tone 1477 Hz were detected, i.e. DTMF digit 3.

A validator 90 validates or determines if the contents of registers 86 and 88 may contain a valid DTMF digit during each 1 kilohertz sample. The validation includes determining if one and only one tone is detected in each of registers 86 and 88. To comprise a valid DTMF digit, only one low frequency tone and one high frequency tone must be present during each sample. If the validator 90 determines that a valid DTMF tone may be present, a validation output is provided to a further validator 92 which checks the amplitudes of the tones relative to each other, i.e. one tone must be within a predefined range of the amplitude of the other tone.

Assuming that tones F1 and F7 are present, validator 92 determines whether the amplitude of tone F1 is within the required amplitude range relative to the amplitude of tone F7. A validation output from validator 92 is provided to a final validator 94 which checks the tone duration against specified limits. That is, the number of samples during which registers 86 and 88 have remained constant is counted in order to establish a time duration of the length of received tones which may represent a DTMF digit. Also, validator 92 must be satisfied during this count. In the illustrative embodiment it is preferred that the tones be detected for a maximum length of time consistent with the minimum defined digit length in order to make a determination of a valid digit. This assists in distinguishing against false detections by requiring a longer continuous duration in which the same tones must have been detected. In accordance with an exemplary embodiment, approximately 25 milliseconds of a minimum duration of 40 milliseconds of a DTMF tone is required to be detected in order to constitute a valid decision by validator 94 that a DTMF digit has been received. Further discussion concerning the timing criteria will be discussed with regard to FIGS. 5–8. Output channel 96 carries a digit output decision from validator 94 which constitutes a final determination of the received digits. In accordance with the exemplary embodiment, output 96 would be indicative that DTMF digit "3" was received. If the tones represented by registers 86 and 88 do not remain stable and constant, or do not pass validators 90 and 92, for the minimum time determined by validator 94, then the validation process is reset.

Although various implementations and elements may be utilized to meet differing design requirements, the following specific elements are described for an illustrative embodiment. The high-pass filter 14 may comprise two (digitally implemented) filter sections having a cutoff frequency to minimize power line and other very low frequency signals. The band elimination filters 16 and 18 may each comprise three (digitally implemented) filter sections having corner frequencies set to eliminate the respective high-band and low-band sets of tones. The bandpass filters BF1–BF8 may be realized each with two pole IIR bandpass filters. Although a two-pole filter does not provide extremely high selectivity, each filter achieves a relatively high (quick) response time. This enhances the ability to provide appropriate talk-off performance. The attenuation provided by the filters at ±1.8% from center frequency should be adjusted to provide equal amplitudes relative to the amplitudes of the variable threshold signal. The rejection or attenuation of the signal must be sufficient to satisfy a requirement to reject tones which are ±3% from the specified center frequency of each of the eight tones. These filters provide a 1.5 dB difference between frequencies at ±1.8% from center frequency and frequiencies at ±3.0% from center frequency. In the illustrative embodiment, it is believed that the proper adjustment of the bandpass filters relative to the outputs and response characteristics of the low-pass VTN filters 24 and 30 contribute to the improved performance of the digit detector.

The energy detectors 22 and 28 may comprise conventional energy detecting techniques such as utilizing a squaring function in order to determine energy levels. The individual tone amplitude detectors 34–48 utilize a technique based on the following formula:

$$\text{Squared Amplitude} = x1*x1 - 2*\cos(w0*T)*x1*x2 + x2*x2$$

where:
  w0=frequency of a sine wave
  T=sampling period
  x1=a sample value of the sine wave
  x2=next sequential value of the sine wave This formula is utilized to determine the squared amplitude of the tones at each center frequency w0. The measured amplitude is substantially exact within a constant multiplier and is independent of the sample values chosen. If the frequency of an actual signal is close to w0 then the amplitude of this sine wave is also measurable by this formula but with increasing error as the frequency of the actual tone varies from the center frequency. Within the required bandwidth of ±1.8%, the accuracy to which the amplitude can be measured is within a few tenths of a decibel (dB). In view of the down-sampling to 1 kilohertz which translates to one sample each millisecond, this technique minimizes the number of computations required to calculate the corresponding amplitudes for the outputs of the eight bandpass filters. Amplitude detectors 34–48 also provide a scaling function relative to the variable threshold levels.

Figure 3:
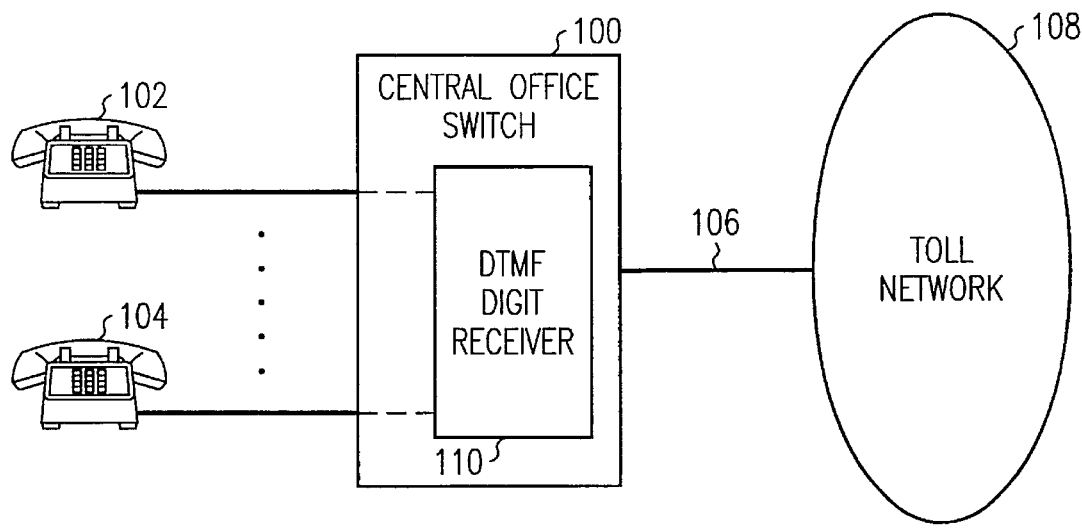
FIG. 3 illustrates a telecommunication network which incorporates a DTMF digit receiver in accordance with the present invention.

Referring to FIG. 3 a central office switch 100 supports a plurality of customer premises equipment 102 and 104 which may include conventional telephone sets which utilize DTMF signaling. The central office switch 100 is connected by trunks 106 to a toll telecommunication network 108. The switch includes a DTMF digit receiver 110 which can be selectably coupled to receive digitized PCM data from a subscriber's line to determine if one or more DTMF digits have been transmitted by a corresponding user. The output from the digit receiver 110 is supplied to the central office switch which makes decisions concerning the routing of the call or other services based upon the DTMF digits which have been received. Of course, services at other than a central office switch could also benefit from the present invention. The application of a DTMF receiver as described in FIGS. 1 and 2 may be utilized as the DTMF digit receiver 110 such as utilized in a telecommunications application. However, it will be apparent to those skilled in the art that other applications of such a digit receiver may be utilized in a variety of applications where the detection of tones or digits is required, especially in an environment in which other signals are present and which must be distinguished from the detection of such tones.

Figure 4:
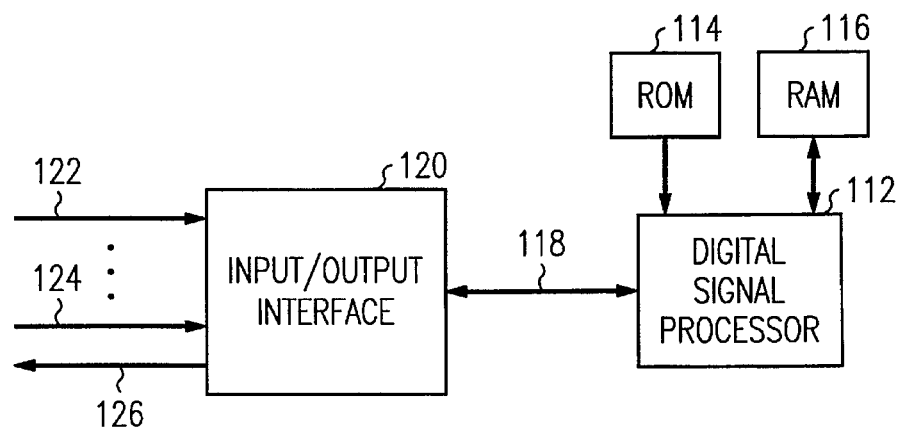
FIG. 4 illustrates an exemplary embodiment of a DTMF digit receiver such as shown in FIG. 3.

FIG. 4 illustrates an architectural implementation of the exemplary embodiment of the detector shown in FIGS. 1 and 2. A digital signal processor such as a DSP32C available from AT&T is utilized to implement the functionality illustrated in FIGS. 1 and 2. A read-only memory (ROM) 114 provides control instructions for the DSP 112. An associated random access memory (RAM) 116 is coupled to the DSP 112 and provides a location in which received data and other parameters of the DSP can be stored. Digital data channel 118 is coupled to DSP 112 and input/output interface 120 which provides an interface that receives incoming digital data on channels 122 and 124 such as in PCM format and provides a mechanism for outputting digital data on line 126 representing DTMF decisions which can be acted upon by auxiliary equipment (not shown). Preferably, the DSP 112 is capable of simultaneously processing a plurality of input PCM data samples, i.e. more than a single channel, and can make tone decisions concerning more than one channel at a time. The output channel 126 (which corresponds to output decision channel 96 in FIG. 2) likewise provides decision information concerning a concurrent plurality of input data concurrently processed by the digital signal processor 112. The number of channels which can be concurrently served by the DSP will be dependent upon the particular design implementation, the ratio of down-sampling utilized, and the particular implementation of the filters and calculation of energies required in accordance with the illustrative embodiment.

FIGS. 5–8 are graphs which demonstrate the relative magnitude of a variable threshold signal relative to the amplitude of corresponding tone outputs. The horizontal axis represents time and in the exemplary embodiment represents a total time of approximately 50 milliseconds with a tone duration of 40 milliseconds. In these graphs it will be assumed that the signal value corresponds to the squared amplitude of tone F1 and that the variable threshold signal corresponds to the output 60 from maximum selector 56.

Figure 5:
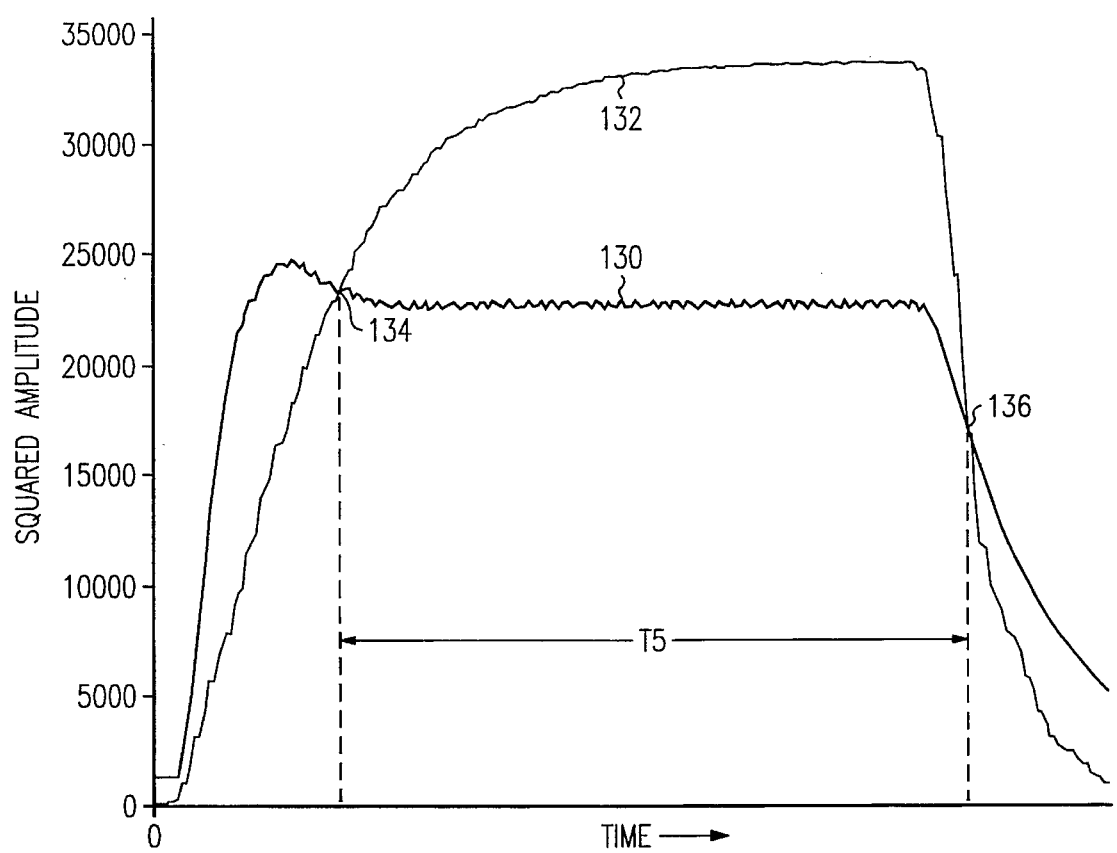
FIGS. 5, 6, 7, and 8 are graphs illustrating the relationship of the amplitude of a detected signal relative to the amplitude of the variable threshold for different signal environments.

FIG. 5 illustrates variable threshold signal 130 (squared amplitude) relative to a detected squared energy level F1 represented by graph 132. It will be observed that the rise time of curve 130 representing the variable threshold is faster than that of signal 132; this is due to the slightly wider bandwidth of the VTN low-pass filter as compared to the bandpass filter BPF1. Curve 132 initially crosses and becomes larger than curve 130 at point 134. Curve 132 decreases and becomes less than curve 130 at point 136. The time T5 between points 134 and 136 define the time in which data samples are determined to meet the proper tone criteria, that is, curve 132 stays continuously above variable threshold curve 130 during this T5 time interval. This reflects a continuous period of detection of the corresponding tone which generated curve 132. In the exemplary curve as shown in FIG. 5, the tone has an exact center frequency and was transmitted with a properly paired higher frequency tone in a relatively noise-free environment. The vertical distance between curves 132 and 130 at the point of maximum separation represents a small relative amount such as 1.7 dB. In accordance with a preferred embodiment of the present invention, the closeness of these two curves during the time in which curve 132 exceeds curve 130 assists in the performance of the illustrative embodiment in rejecting talk-off and false signals.

Figure 6:
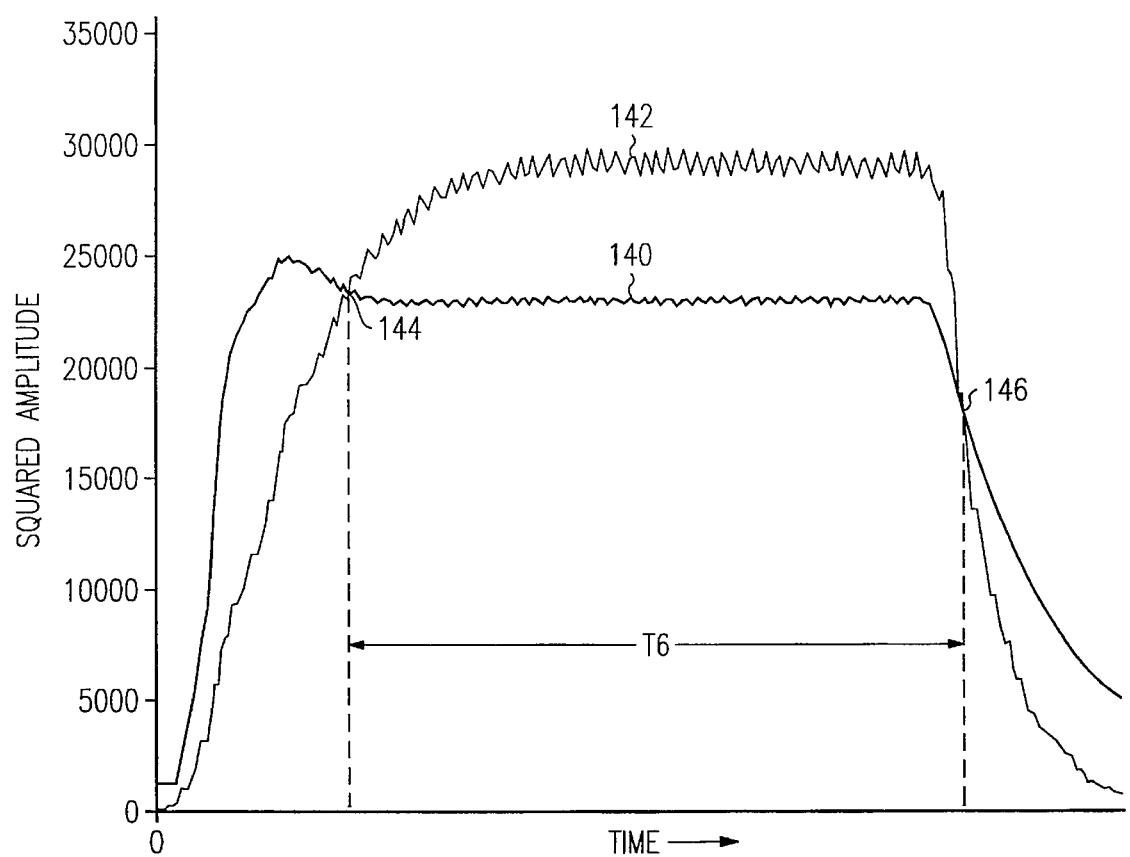

FIG. 6 is similar to FIG. 5 wherein the variable threshold curve 140 is illustrated relative to a curve 142 representing signal detection frequency F1. It will be observed that the curve 142 is relatively uneven and has what might be called jitter or noise associated therewith. This is due to the fact that FIG. 6 illustrates that the tone associated with curve 142 was 1.8% above the proper center frequency. As will be seen this results in some choppiness or uncertainty about curve 142 relative to curve 132, especially in the area in which curve 142 exceeds curve 140 which is determined between points 144 and 146 defining time interval T6. This 1.8% variation represents the maximum frequency deviation which a tone can deviate and constitute a valid digit. Not shown is the complementary high frequency tone which would have been concurrently generated. The time interval T6 is substantially equivalent to T5 and would result in meeting the required criteria for a valid DTMF digit detection. It will also be noted that the magnitude of curve 142 relative to curve 140 is substantially closer during time T6 than the distance between curve 132 and curve 130 at time interval T5. This is caused primarily due to the fact that the off-center frequency is attenuated more by its corresponding bandpass filter since it is not at center frequency. The vertical distance between curves 142 and 140 at the point of maximum separation is 1 dB.

Figure 7:
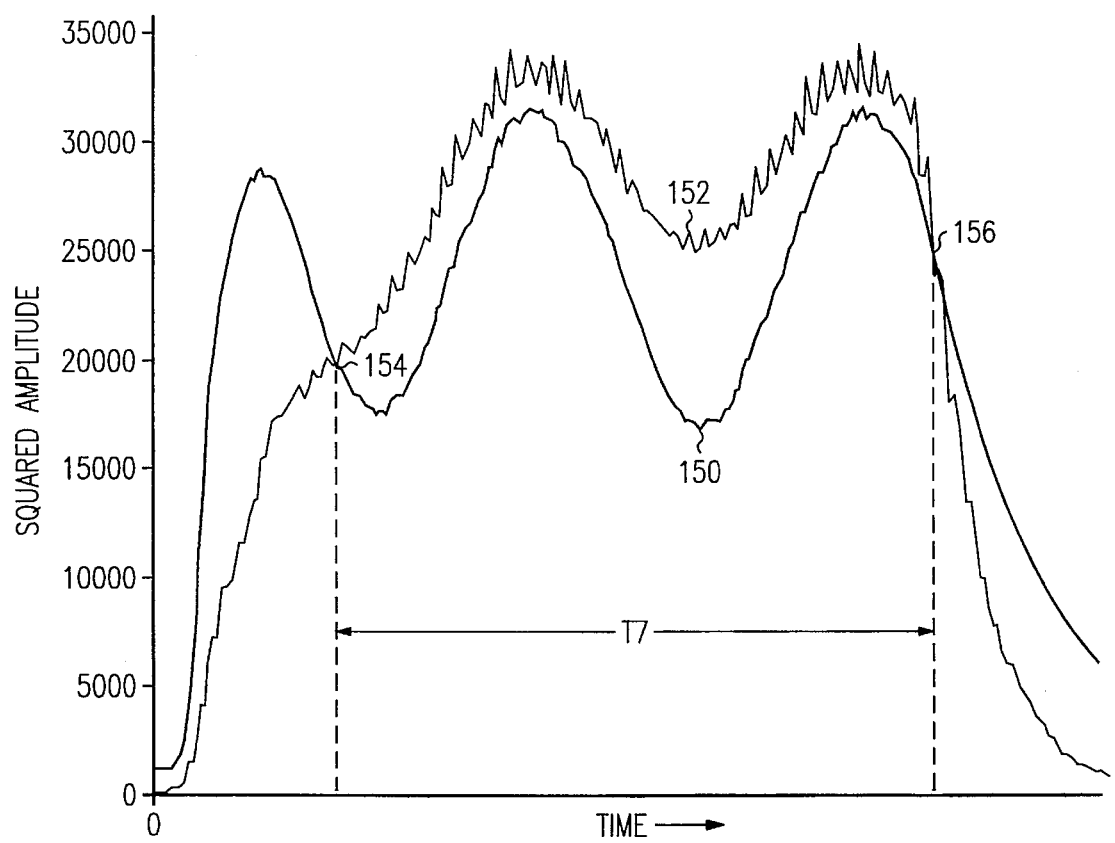

FIG. 7 illustrates a graph in which both the variable threshold signal 150 and the detected energy signal 152 have substantial oscillations even during the interval between crossover points 154 and 156 defining time interval T7. This graph illustrates a received tone which is +1.8% high from its center frequency, a companion higher frequency tone (not shown) which is 6 dB above the lower frequency tone, and intermodulation products that are 16 dB below the lower frequency tone magnitude (intermodulation products) occurring at 1813 hertz and 767 hertz. The impact of the intermodulation products, especially the 767 hertz frequency product which is relatively close to the lower frequency tone F1, gives rise to a sinusoid variation during the time period T7. However, it will be noted that at no time during period T7 does curve 152 intersect or go below curve 150. Thus, even in the presence of such interfering signals and an above amplitude higher frequency tone pair (not shown), the signal represented by 152 does not intersect nor cross the corresponding variable threshold curve 150 during the time interval T7. That is, T7 represents a continuous interval in which tone 152 would be detected in accordance with the present invention.

Figure 8:
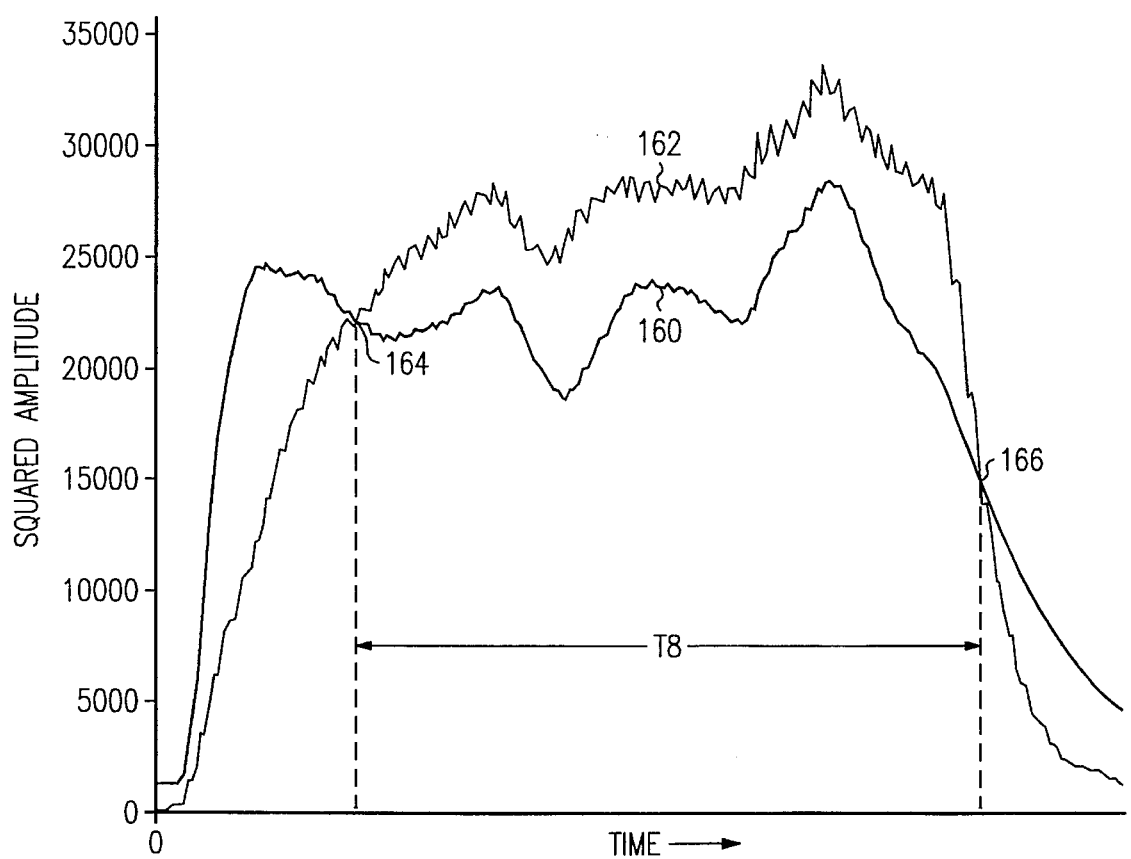

FIG. 8 illustrates a graph in which both the variable threshold signal 160 and the detected energy signal 162 have substantial noise during the interval between crossover points 164 and 166 defining time interval T8. This graph illustrates a signal-to-noise ratio of 16 dB using Gaussian white noise. It will be noted that even during the presence of this noise, curve 162 does not cross nor intersect curve 160 during period T8. Thus, even in the presence of such white noise, the signal represented by curve 162 does not intersect nor cross the corresponding variable threshold curve 160 during the time interval T8. That is, T8 represents a continuous interval in which tone 162 would be detected in accordance with the present invention. FIGS. 7 and 8 demonstrate that with the addition of signals outside the bandwidth of the desired tone, the margin or difference between the signal curve and the variable threshold curve tends to narrow. The wider margins shown in FIGS. 5 and 6 between the received signal and the variable threshold signal is provided so that even in the presence of extraneous signals and noise conditions, such as shown in FIGS. 7 and 8, there will be sufficient margin to maintain consistent tone detection.

Referring to FIG. 5, it will be noted that the trailing edges of the curves 130 and 132 are disposed such that curve 132 has a more rapid fall rate than curve 130. This is generally desirable in order to provide repetitive measurements which would be more difficult to achieve if both curves had approximately the same slope at the point of the intersection at point 136. The flattening of the slope of curve 130 is controlled by the feedback loop of elements 50, 51, and 55 shown in FIG. 2 and by the selection of maximum selector 54. This provides a more gradual slope for curve 130 than would have been produced had only a current sample been used.

The presence of substantial voice energy, not attenuated by the band rejection filters 16 and 18, relative to the magnitude of a tone which may be simultaneously occurring, will nominally result in the variable threshold curve being greater than the narrow band tone energy curve due to the additional energy components provided by the in-band voice characteristics. This will, of course, prevent a detection of a valid DTMF tone if voice signals of a significant magnitude are present. This represents a compromise between the desired ability to detect a tone during other extraneous signal conditions and the ability to not falsely detect a tone when significant other signals are present.

Several factors are believed to positively impact the good performance of the DTMF receiver in accordance with the embodiment of the present invention in both detecting tones within the various defined parameters for acceptable tones while simultaneously minimizing talk-off and extraneous false detections. The separation of the tones into high and low filter groups with the corresponding opposite group being eliminated by a bandpass filter is believed to be beneficial. Utilizing such filtered high and low bands to generate a dynamically variable threshold against which the narrower band amplitudes are compared contributes to the results achieved. The ability to down-sample minimizes the number of instructions and computational power required in order to implement the functions in accordance with the present invention. The so-called post-processing validation steps 90, 92, and 94 provide further criteria insuring that a DTMF digit should be recognized as having been received. A corresponding exemplary method also in accordance with the present invention as has been explained with regard to the illustrative embodiment.

This invention also contemplates further variations and modifications. Although down sampling to 4 kHz and then 1 kHz was described, other down sampling rates could be utilized depending on performance and computational tradeoffs. Bandpass filters with more poles could be used to flatten the in-band frequency response characteristic in order to provide a more consistent vertical distance between the tone response curve and the VTN curve. However, the time response of the bandpass filters relative to the time response of the lowpass filters associated with the variable thresholds must be maintained.

Although an embodiment of the Present invention has been described above and illustrated in the accompanying drawings, the scope of the invention is defined by the claims which follow.

The invention claimed is:

1. A tone detector that detects the presence of a first tone in a first frequency band on a communication channel that carries voice information which includes spectral components within the first frequency band, the communication channel also carrying at least a second tone in a second frequency band that does not overlap the first frequency band, the tone detector comprising:

means for receiving signals carried on the communication channel;

a band elimination filter coupled to the receiving means that generates a first filtered signal in which signals in the second frequency band have been attenuated;

a band pass filter coupled to the band elimination filter that band pass filters the first filtered signal to generate a second filtered signal, the band pass filter having a pass frequency band that includes the first frequency and hence passes the first tone in the second filtered signal;

means coupled to the band elimination filter for generating a variable threshold signal based on the amplitude of the first filtered signal;

means coupled to the band pass filter for generating a third signal based on the amplitude of the second filtered signal;

means for comparing the amplitudes of the third signal and the variable threshold signal;

means coupled to the comparing means for determining if the first tone has been received based on the results of said comparison, the determining means determining the first tone is present when the amplitude of the third signal exceeds the amplitude of the variable threshold signal for a predetermined period of time.

2. The tone detector according to claim 1 wherein the band elimination filter has a second frequency band which does not include frequencies in the first frequency band and does not include the highest frequency carried by the communication channel.

3. The tone detector according to claim 1 wherein said means for generating a variable threshold signal comprises a low-pass filter which low-pass filters the third signal.

4. The tone detector according to claim 3 wherein time delays of signals passing through the band pass filter are substantially equal to time delays of signals passing through the low-pass filter so that time delays associated with the third signal and the variable threshold signal are substantially the same.

5. The tone detector according to claim 1 wherein the communication channel carries digitally encoded signals representing samples of information at a first sampling rate, and the third signal and variable threshold signal are digitally encoded signals generated at a second sampling rate which is less than the first sampling rate.

6. The tone detector according to claim 5 wherein the means for generating the third signal operates at said second sampling rate.

7. The tone detector according to claim 1 wherein said means for generating the third signal comprises deriving the squared amplitude of the second filtered signal based on a formula using first and second samples of the second filtered signal, the frequency of the first tone, and the period between the first and second samples.

8. A dual tone multifrequency (DTMF) digit detector that detects the reception of a DTMF digit having concurrent first and second tones at first and second frequencies within high and low frequency bands, respectively, the DTMF digit detector comprising:

means for receiving signals carried on a communication channel, the signals including voice information and said first and second tones;

high frequency (hf) and low frequency (lf) band elimination filters coupled to the receiving means generate first and second filtered signals, respectively, the hf and lf band elimination filters attenuating DTMF tones in the high and low frequency bands, respectively, so that the first filtered signal has hf band DTMF tones attenuated and the second filtered signal has lf band DTMF tones attenuated;

first and second means coupled to the hf and lf band elimination filters, respectively, for band pass filtering the first and second filtered signals to generate first and second sets of band pass filtered signals, respectively, the first set of band pass filtered signals including a first bpf signal for each DTMF tone in the low frequency band and the second set of band pass filtered signals including a second bpf signal for each DTMF tone in the high frequency band;

third and fourth means coupled to the hf and lf band elimination filters, respectively, for generating third and fourth variable threshold signals based on the amplitude of the first and second filtered signals, respectively;

amplitude means receiving the first and second sets of bpf signals for generating corresponding fifth and sixth sets of signals based on the amplitude of the first and second sets of signals;

means coupled to the first, second, and amplitude means for comparing the amplitudes of each of the first bpf signals and the third variable threshold signal, and comparing the amplitudes of each of the second bpf signals and the fourth variable threshold signal;

means coupled to the comparing means for determining if a DTMF digit is present based on the results of said comparisons, the determining means determining a DTMF digit is present when the amplitude of one of the first bpf signals exceeds the amplitude of the third variable threshold signal for a predetermined period of time and the amplitude of one of the second bpf signals exceeds the amplitude of the fourth variable threshold signal for said predetermined period of time.

9. The DTMF digit detector according to claim 8 wherein said determining means determines a DTMF digit is present when the amplitude of only one of the first bpf signals exceeds the amplitude of the third variable threshold signal for a continuous predetermined period of time and the amplitude of only one of the second bpf signals exceeds the amplitude of the fourth variable threshold signal for said continuous predetermined period of time.

10. The DTMF digit detector according to claim 8 wherein said hf band elimination filter only attenuates signals with frequencies between the lowest frequency DTMF tone in the high frequency band and the highest frequency DTMF tone in the high frequency band.

11. The DTMF digit detector according to claim 8 wherein time delays of the first and second bpf signals as filtered by the first and second means are substantially equal to time delays of the third and fourth threshold signals, respectively.

12. The DTMF digit detector according to claim 8 wherein the communication channel carries digitally encoded signals representing samples of information at a first sampling rate, the first and second filtered signals and the first and second sets of bpf signals are digitally encoded signals generated at a second sampling rate which is less than the first sampling rate.

13. The DTMF digit detector according to claim 12 wherein the comparing means operates at a third sampling rate which is less than said second sampling rate.

14. The DTMF digit detector according to claim 8 wherein said amplitude means comprises deriving the squared amplitude of the first and second sets of bpf signals based on a formula using first and second samples of a signal, the frequency of the signal, and the period between the first and second samples.

15. The DTMF digit detector according to claim 8 further comprising means, coupled to the first and second means, for comparing the amplitude of the first bpf signal to the amplitude of the second bpf signal to determine twist, that is, the amplitude of the first bpf signal relative to the second bpf signal, said determining means making the determination of whether a DTMF digit is present based on the twist.

16. A method for detecting dual tone multifrequency (DTMF) digits having concurrent first and second tones at first and second frequencies within high and low frequency bands, respectively, the method comprising:

receiving signals carried on a communication channel, the signals including voice information and said first and second tones;

generating first and second filtered signals by high frequency (hf) and low frequency (lf) band elimination filtering the first and second filtered signals, respectively, the hf and lf band elimination filtering attenuating DTMF tones in the high and low frequency bands, respectively, so that the first filtered signal has hf band DTMF tones attenuated and the second filtered signal has lf band DTMF tones attenuated;

band pass filtering the first and second filtered signals to generate first and second sets of band pass filtered signals, respectively, the first set of band pass filtered signals including a first bpf signal for each DTMF tone in the low frequency band and the second set of band pass filtered signals including a second bpf signal for each DTMF tone in the high frequency band;

generating third and fourth variable threshold signals based on the amplitude of the first and second filtered signals, respectively;

generating corresponding fifth and sixth sets of signals based on the amplitude of the first and second sets of signals;

comparing the amplitudes of each of the first bpf signals and the third variable threshold signal, and comparing the amplitudes of each of the second bpf signals and the fourth variable threshold signal;

determining if a DTMF digit is present based on the results of said comparisons, the determining step determining a DTMF digit is present when the amplitude of one of the first bpf signals exceeds the amplitude of the third variable threshold signal for a predetermined period of time and the amplitude of one of the second bpf signals exceeds the amplitude of the fourth variable threshold signal for said predetermined period of time.

17. The method according to claim 16 wherein said determining step determines a DTMF digit is present when the amplitude of only one of the first bpf signals exceeds the amplitude of the third variable threshold signal for a continuous predetermined period of time and the amplitude of only one of the second bpf signals exceeds the amplitude of the fourth variable threshold signal for said continuous predetermined period of time.

18. The method according to claim 16 wherein said hf band elimination filtering only attenuates signals with frequencies between the lowest frequency DTMF tone in the high frequency band and the highest frequency DTMF tone in the high frequency band.

19. The method according to claim 16 wherein time delays of the first and second bpf signals are substantially equal to time delays of the third and fourth threshold signals, respectively.

20. The method according to claim 16 wherein the communication channel carries digitally encoded signals representing samples of information at a first sampling rate, the first and second filtered signals and the first and second sets of bpf signals are digitally encoded signals generated at a second sampling rate which is less than the first sampling rate.

21. The method according to claim 20 wherein the comparing step operates at a third sampling rate which is less than said second sampling rate.

22. The method according to claim 16 wherein the generating of the fifth and sixth sets of signals comprises deriving the squared amplitude of the first and second sets of bpf signals based on a formula using first and second samples of a signal, the frequency of the signal, and the period between the first and second samples.

23. The method according to claim 16 further comprising the steps of comparing the amplitude of the first bpf signal to the amplitude of the second bpf signal to determine twist, that is, the amplitude of the first bpf signal relative to the second bpf signal, said determining step making the determination of whether a DTMF digit is present based on the twist.

* * * * *